US012610993B2

(12) United States Patent
Norris

(10) Patent No.: US 12,610,993 B2
(45) Date of Patent: Apr. 28, 2026

(54) PATIENT CLOTHING SYSTEM WITH INTEGRATED LIFTING FEATURES

(71) Applicant: Temeka T. Norris, Bolingbrook, IL (US)

(72) Inventor: Temeka T. Norris, Bolingbrook, IL (US)

( * ) Notice: Subject to any disclaimer, the term of this patent is extended or adjusted under 35 U.S.C. 154(b) by 520 days.

(21) Appl. No.: 17/668,182

(22) Filed: Feb. 9, 2022

(65) Prior Publication Data

US 2023/0248603 A1 Aug. 10, 2023

(51) Int. Cl.

| | |
|---|---|
| ***A41D 13/12*** | (2006.01) |
| ***A41D 13/00*** | (2006.01) |
| ***A61G 7/10*** | (2006.01) |
| *A61H 3/00* | (2006.01) |

(52) U.S. Cl.

CPC ..... *A41D 13/0007* (2013.01); *A41D 13/1236* (2013.01); *A41D 13/1245* (2013.01); *A41D 13/1254* (2013.01); *A41D 13/1263* (2013.01); *A61G 7/10* (2013.01); *A61G 7/1051* (2013.01); *A61G 7/1023* (2013.01); *A61H 3/008* (2013.01); *A61H 2201/163* (2013.01); *A61H 2201/165* (2013.01)

(58) Field of Classification Search

CPC ................ A41D 13/0007; A41D 13/12; A41D 13/1236; A41D 13/1245; A41D 13/1254; A41D 13/1263; A61G 7/10; A61G 7/1013; A61G 7/1023; A61G 7/1051

See application file for complete search history.

(56) References Cited

U.S. PATENT DOCUMENTS 6,073,280 A * 6/2000 Farnum .............. A62B 35/0025 5/89.1
6,122,778 A * 9/2000 Cohen ................ A62B 35/0006 5/81.1 R
7,945,975 B2 * 5/2011 Thomas ............... A61G 7/1023 5/81.1 R
8,656,516 B1 * 2/2014 Reinhardt Rawlings .................... A41D 11/00 2/69
9,015,880 B1 * 4/2015 Cauthen ............... A61G 7/1038 5/83.1
10,945,471 B1 * 3/2021 Reddy .................... A41B 9/026
2007/0157362 A1 * 7/2007 Rogers ............... A41D 13/1263 2/114
2009/0144876 A1 * 6/2009 Pena .................. A41D 13/0007 5/81.1 R (Continued)

*Primary Examiner* — Keri J Nelson

(74) *Attorney, Agent, or Firm* — FBT Gibbons LLP

(57) ABSTRACT

A clothing system including an upper body garment and a lower body garment. The upper body garment has a neck portion that extends about a central axis from a head of a patient towards to feet of the patient. The upper body garment includes a pair of shoulder coverings, a torso covering, and a plurality of first fasteners. The plurality of first fasteners is configured to be transitioned so that each of the shoulder coverings may be separated to provide access to the upper torso and/or arm of a patient. The lower body garment includes a pair of leg coverings, a rise, an access covering, and a plurality of second fasteners. The rise includes a window spaced apart from a waist retainer positioned at the top of the rise and covered by an access covering selectively retained by the plurality of second fasteners to provide access to the lower body.

20 Claims, 8 Drawing Sheets

(56) References Cited

U.S. PATENT DOCUMENTS

| | | | | |
|---|---|---|---|---|
| 2012/0324630 | A1* | 12/2012 | O'Brien | A41D 13/0007 2/236 |
| 2015/0059048 | A1* | 3/2015 | Stanley | A41D 13/129 2/69 |
| 2015/0157069 | A1* | 6/2015 | Hieber | A41D 13/129 2/114 |
| 2019/0166926 | A1* | 6/2019 | Doroski | A41D 13/0007 |
| 2019/0274374 | A1* | 9/2019 | Marconi | A41D 1/08 |
| 2019/0364992 | A1* | 12/2019 | Thomas | A41D 13/1245 |
| 2021/0100681 | A1* | 4/2021 | Miles | A61F 5/4404 |
| 2021/0129956 | A1* | 5/2021 | Cohen | A41F 9/005 |
| 2021/0289855 | A1* | 9/2021 | Colon-Alfonso | A41D 13/1245 |
| 2022/0079274 | A1* | 3/2022 | Mathews | A41D 13/0575 |
| 2023/0240392 | A1* | 8/2023 | Lucas | A41D 15/002 2/69 |

* cited by examiner

PATIENT CLOTHING SYSTEM WITH INTEGRATED LIFTING FEATURES

STATEMENT REGARDING FEDERALLY SPONSORED RESEARCH OR DEVELOPMENT

None.

TECHNICAL FIELD

This disclosure relates to articles of clothing for hospital patients, and more specifically for patients with reduced mobility; articles of clothing for patients having procedures performed that require additional access to the upper torso or pelvic region of the patient; and/or patients that have surgical devices entering and/or exiting the body through the upper torso or pelvic region.

BACKGROUND

Elderly, handicapped, and infirm patients have varying degrees of mobility. Such reduced mobility patients may require caregivers to move them from a hospital bed to another location by using a gurney or wheelchair.

Traditionally, reduced mobility patients face a long grueling process of being lifted from the hospital bed to a wheelchair several times a day to use the restroom or to be transported to another location by a gurney such as for surgery or moving to another room. The caregivers usually hook the patient to a lifting machine that lifts them from the hospital bed to a wheelchair or a gurney. This lifting process is time consuming and physically taxing on the caregivers.

These caregivers may also need to have discrete access to the upper torso. For example, cardiac, breast augmentation, and lung cancer patients have tubes entering the patient's upper torso and/or wiring placed on the skin of the patient's upper torso. The tubes and/or wiring must pass through or around the patient's clothing in order for the caregivers to access the heart, lungs, and breasts. For example, the upper torso may require to be accessed with wiring that leads to a heart monitor or EKG machines to monitor the heart, or Jackson-Pratt tubes may require to be hooked to the lungs or breasts to remove fluids to prevent infection. This may require the shirt of the patient to be removed or pulled up in a way that is embarrassing for the patient.

The pelvic regions of patients may also need to be accessed for maintenance associated with testicular cancer, prostate cancer, and hysterectomies. These procedures also require Jackson-Pratt tubes to be connected after a surgical procedure. Other elective surgeries such as gluteal enhancement patients and prostate cancer patients require drains connected to the gluteal regions of the body.

Additionally, the bulbs from the Jackson Pratt tubes and portable medical machines need to be placed in close proximity to the patients. The bulbs and portable medical machines are traditionally uncomfortably taped or strapped to the body of the patient.

In U.S. Patent Application Publication No. US 2014/0230130, Edwards discloses a garment with moveable and removable panels. The zippered panels may be placed to cover the front/crotch area of the pants and unzipped to provide access to the interiors of the garment. Edwards also discloses that the panels may be trapezoidal in shape or various other shapes as well, such that when the panel is unzipped and in the open configuration, the waistband defines the upper limits of the opening and the edges of the pants adjacent to the zippers define the two sides.

In U.S. Pat. No. 5,926,851, issued to Kovalik, a garment for use by the elderly, handicapped and infirmed is disclosed. The garment has a flap provided in the front torso portion to allow easy donning and removal of the garment. Kovalik also discloses that the flap extends from the waistband down to the crotch area of the garment and includes attachment means for securing the flap including Velcro strips along the length of the flap and buttons at the top to secure the flap to the waistband.

In U.S. Patent Application Publication No. US2013/0007939 Martinez discloses a set of clothing for use by handicapped children and adults that have been adapted to be fashionable and comfortable as well. Martinez discloses a pair of pants having a pair of zippers along the entire vertical length of the pants for providing relatively easy access to the patient's legs and side while making it relatively easy to put-on and take off the pants. Martinez also discloses that the pants are made for both men and women and can be configured as short pants or other suitable pants as well.

In U.S. Pat. No. 10,687,570 Strange discloses a functional pair of pants for men and women with spinal injuries that allows improved access to pelvic region without removal of the pants. A moveable front flap is formed on the pants via side zippers and a top fastening means that extends across the front of the waistband of the pants. Even individuals with limited fine motor skills can manipulate the corded zipper pulls to allow access for changing an ostomy bag, diaper, or catheterization.

While various garment configurations have been proposed for use by patients to provide the ability to lift a patient, or provide access to their pelvic region, there remains a need for a convenient, useful, and functional garment to meet the needs of these patients and caregivers.

While a variety of clothing has been made and used, it is believed that no one prior to the inventors has made or used an invention as described herein.

BRIEF DESCRIPTION

In general, the present disclosure is directed towards a clothing system that aids caregivers in the movement of a patient. This clothing system provides lifting points for a group of two or more caregivers to grab a patient discretely and safely in a way that is not embarrassing or uncomfortable for the patient and the caregivers. This clothing system provides discrete access to the upper torso and the lower regions of the patient's body without requiring full removal of any component of the clothing system. This clothing system also provides storage compartments within the interior of the clothing system that provide support for medical devices or drain bulbs that is comfortable for the patient.

BRIEF DESCRIPTION OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

Figure 1:
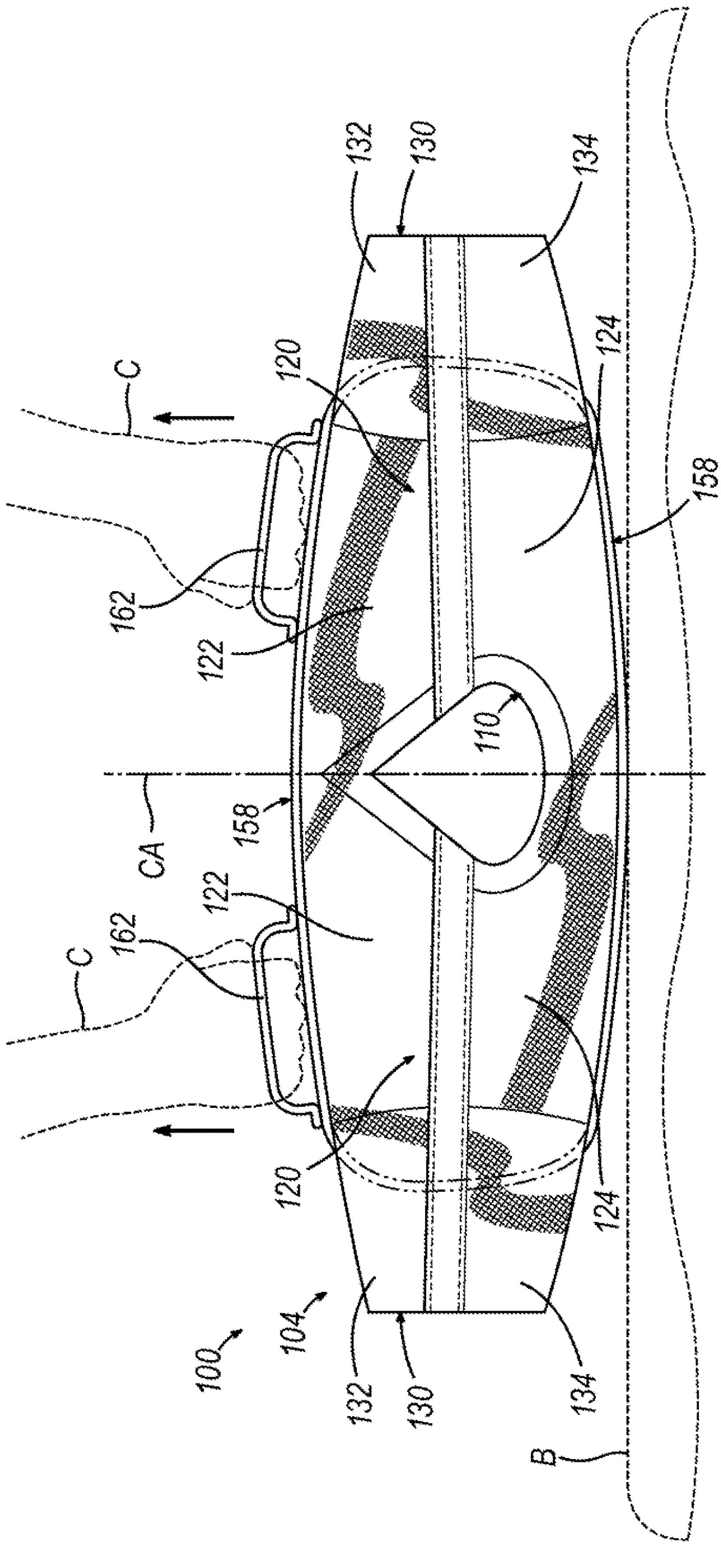
FIG. 1 depicts a top view of a clothing system being lifted by a caregiver.
Figure 2:
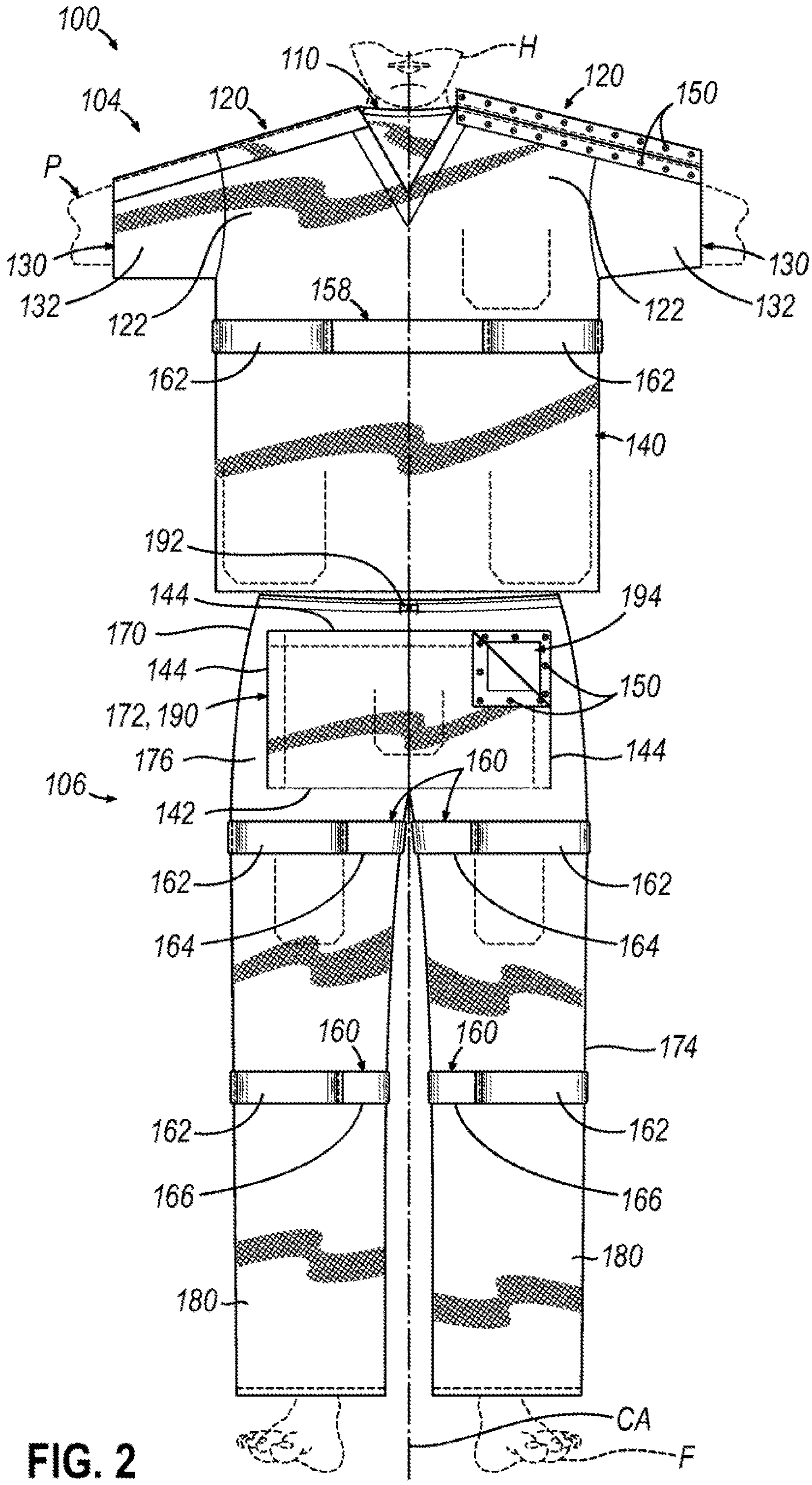
FIG. 2 depicts a front view of the clothing system of FIG. 1 including an upper body garment having a pair of shoulder coverings each including a right front shoulder portion selectively coupled to a right back shoulder portion in a closed position, a left front shoulder portion selectively uncoupled from a left back shoulder portion in an open position, and a lower body garment including an access covering in a partially closed position.
Figure 3:
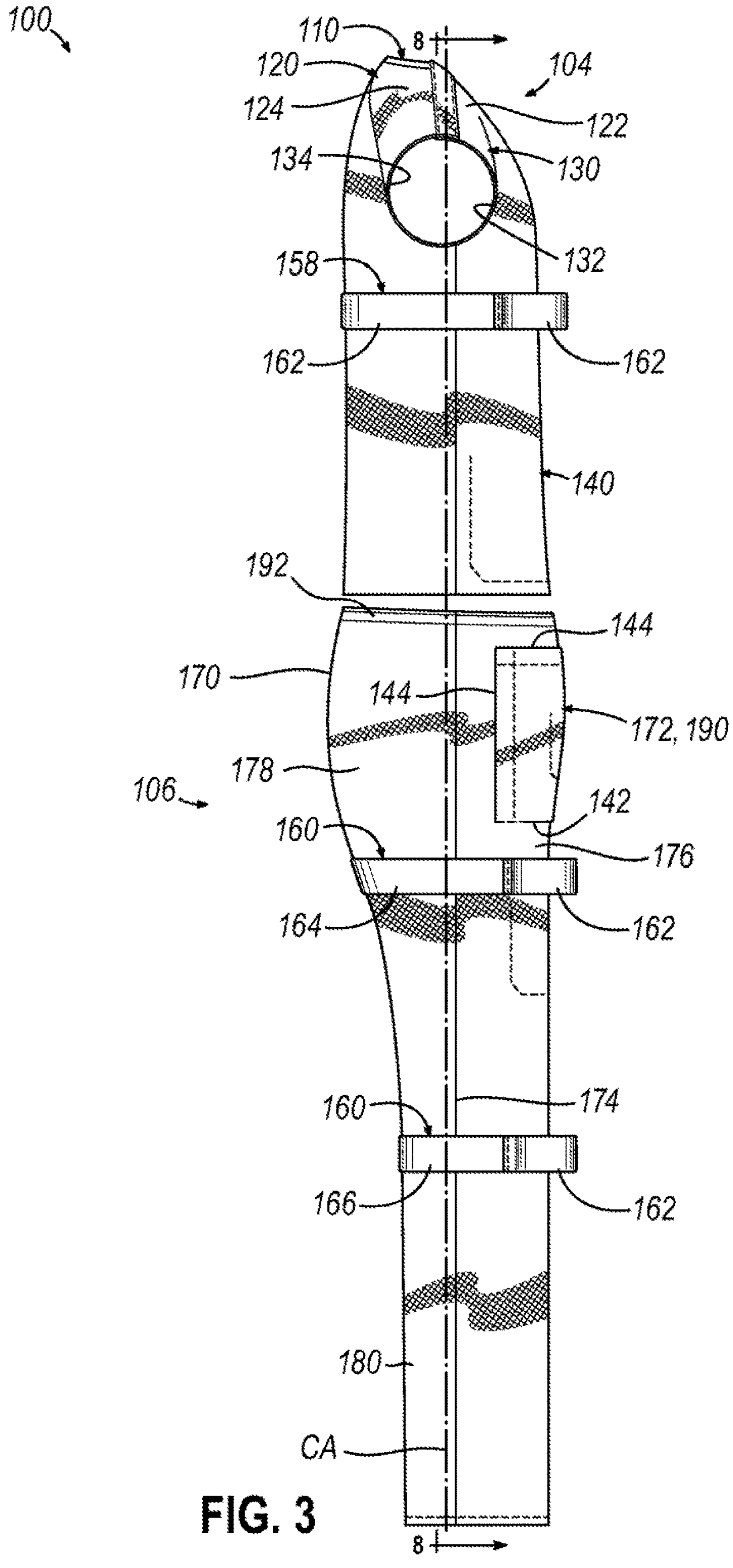
FIG. 3 depicts a right side view of the clothing system of FIG. 1 with the upper and lower body garments in the closed positions.
Figure 4:
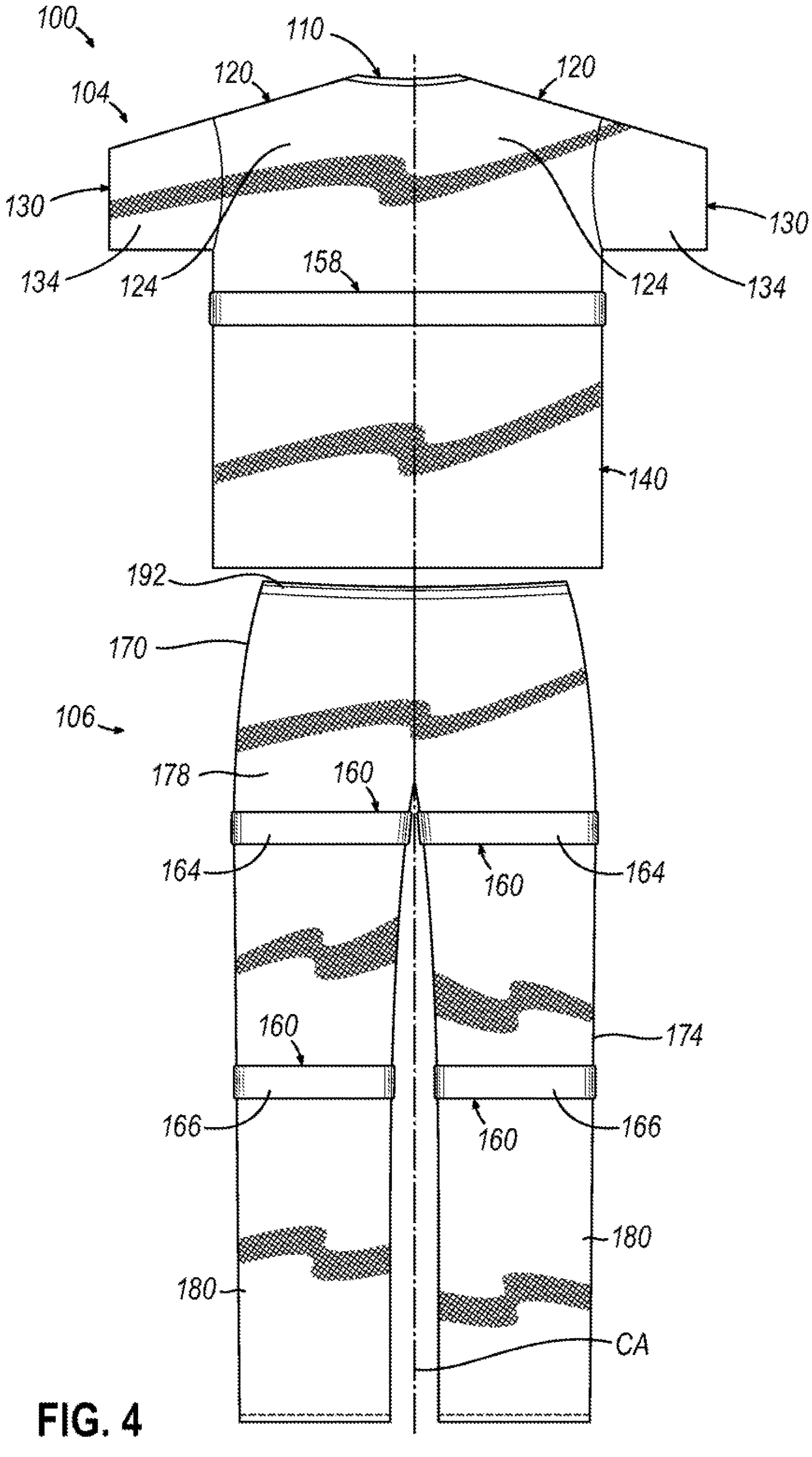
FIG. 4 depicts a rear view of the clothing system of FIG. 1 with the upper and lower body garments in the closed positions.
Figure 5:
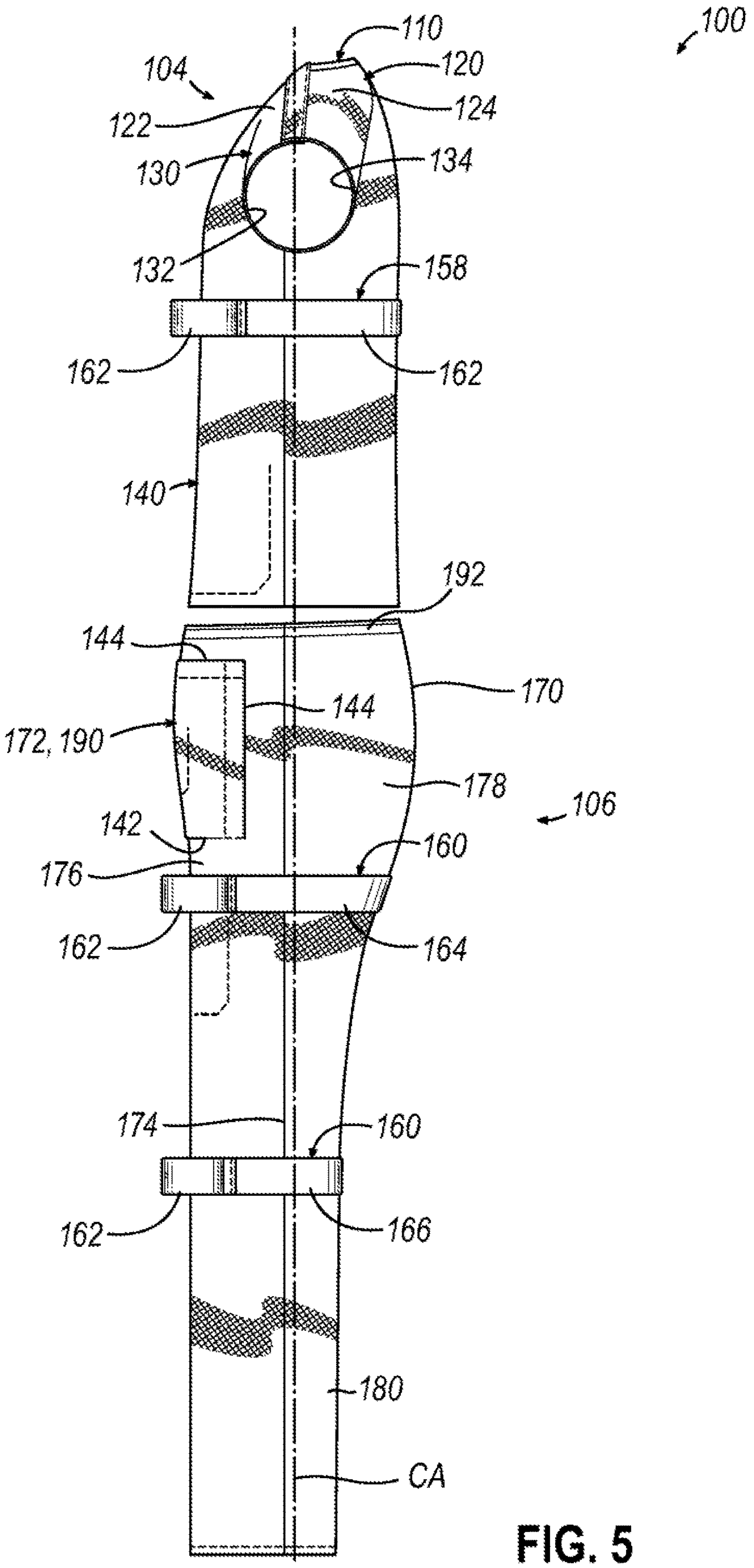
FIG. 5 depicts a left side view of the clothing system of FIG. 1 with the upper and lower body garments in the closed positions.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

For clarity of disclosure, spatial terms such as “top,” “bottom,” “upper,” “lower,” “vertical,” “horizontal,” or the like are used herein with reference to the drawings, it will be appreciated that such terms are used for exemplary description purposes only and are not intended to be limiting or absolute. In that regard, it will be understood that surgical instruments such as those disclosed herein may be used in a variety of orientations and positions not limited to those shown and described herein.

Furthermore, the terms “about,” “approximately,” and the like as used herein in connection with any numerical values or ranges of values are intended to encompass the exact value(s) referenced as well as a suitable tolerance that enables the referenced feature or combination of features to function for the intended purpose described herein.

The present clothing system provides caregivers with the ability to overcome the challenges associated with lifting a patient having restricted mobility, discretely accessing portions of the patient’s body, and providing support for medical equipment that is required to be placed and held in close proximity to the patient’s body.

As shown throughout the Figures in connection with an exemplary clothing system (100) having an upper body garment (104) and a lower body garment (106), the upper body garment (104) may be separately worn from the lower body garment (106) by a patient (P), but garments (104, 106) are best used in tandem to manually lift the patient (P) by two or more caregivers (C) to move the patient (P) from a first location to a second location, such as from a hospital bed to a wheelchair (not shown), a chair (not shown), or a gurney (G), or to help the patient sit up in bed (B). The clothing system (100) eliminates the need to deploy a sheet, net, or harness under the patient (P) and reduce the need to grab the patient (P) directly on the patient’s body, which can be physically and emotionally uncomfortable for both the patient (P) and the caregivers (C). The clothing system (100) allows multiple caregivers (C) the ability to lift one or more selected body portions of the patient (P), with each body portion being less in weight than an overall weight of the patient. The clothing system (100) is also configured to provide direct access to select portions of the patient’s body without requiring full removal of the upper body garment (102) and/or the lower body garment (106). Additionally, the clothing system (100) includes features configured to store and support medical equipment within an interior of the clothing system (100).

FIG. 1 shows a patient (P) with restricted mobility being lifted by a plurality of caregivers (C) utilizing the clothing system (100). The plurality of caregivers (C) may consist of any number of caregivers (C) to manually lift the patient (P) from a bed (B). Each caregiver (C) is positioned to the sides of the patient in order to equally distribute the weight of the patient (P) among the plurality of caregivers (C). This illustration and description is not meant to be restrictive in any way, and it will be understood that caregivers (C) may alternately position themselves about the patient (P) in any manner sufficient to move the patient (P), such as at the head and the feet of the patient (P). Each caregiver (C) uses their personal muscular contraction to lift the patient (P) off of the hospital bed (B), move the patient (P) by walking or turning to a second location, and gently release the patent (P) into the second location. By way of example only, the second location may be a gurney (G), a wheelchair (not shown), a chair (not shown), or another hospital bed (B).

In other instances, one or more caregivers (C) utilizes the clothing system (100) to help the patient (P) to sit up in bed (B) so that the patient (P) may orally take medication or consume beverages or food. Additionally, the clothing system (100) may be used by one or more caregivers (C) to help stabilize the patient (P) so that the patient (P) may get up by using the patient’s (P) own muscular contractions. In some instances, one caregiver (C) must alone move a patient that has restricted mobility. In order to move the patient (P), the caregiver (C) may use the clothing system (100) to safely couple the patient (P) to a mechanical lifting machine (not shown).

As shown in FIGS. 2-5, the clothing system (100) includes an upper body garment (104) and a lower body garment (106). The upper body garment (104) is configured to cover the upper body portion of the patient (P) and the lower body garment (106) is configured to cover a lower body portion of the patient (P). The clothing system (100) is constructed of a machine washable fabric. The fabric is constructed of cotton, polyester, spandex, rayon, or any combination thereof. The fabric is constructed with a weave such as poplin, dobby, twill, and any combinations thereof. The fabric may be treated with various fabric treatments such as: moisture wicking treatments, softness treatments, fluid-repellant treatments, and antimicrobial fabric treatments. The clothing system (100) is configured to be positioned about and extend along a central axis (CA) defined by the patient (P) that extends from a head (H) to feet (F) of the patient (P), such that each of the upper and lower body garments (104, 106) is positioned symmetrically about this central axis (CA).

The upper body garment (104) comprises one of the group: a shirt, a cape, a tunic, a smock, a poncho, a tank top, a scrub, or other suitable variations or combinations thereof. In the present version, the upper body garment (104) is shown in the form of a shirt. The upper body garment (104) may be suitably sized and shaped to conform to a predetermined body type and/or body size, and/or to a range of body types and/or body sizes, which may or may not be specific to a sex. In some such versions, a unisex version of clothing system (100) may be configured to fit both men and women. The upper body garment (104) includes a neck portion (110), a pair of shoulder coverings (120), a torso covering (140), a first plurality of fasteners (150) and one or more lifting features in the form of one or more lifting straps (158) positioned at discrete locations on an outer circumference of the torso covering. The lifting straps (158) may be referred to as the upper body lifting straps. The neck portion (110) extends about the central axis (CA). The neck portion (110) is configured as a style or shape of the group: a V-neck, a jewel, a scoop, a U-neck, a square, a bateau/boat, a cowl, a sweetheart, a halter, or any other suitable shape known in the art to allow a head to pass through an opening of an upper body garment (104). The pair of shoulder coverings (120) includes a left shoulder covering (120) and a right shoulder covering (120). Each of the left and right shoulder coverings (120) includes a front shoulder portion (122) (see FIGS. 2, 3, and 5) and a back shoulder portion (124) (see FIGS. 3, 4, and 5). The pair of shoulder coverings (120) extend laterally away from the central axis (CA) and the neck portion (110) to a pair of sleeves (130). Each sleeve (130) joins with and extends away from the respective shoulder covering (120) in a direction oblique to the central axis (CA). The sleeves (130) may be of any style such as a bishop, a cap, a bell, a kimono, a raglan, a cold shoulder, a Dolman, a batwing sleeve, a leg of mutton, a Juliette, a cuffed, a petal, a puffed, a split or any sleeve of a garment known in the art to cover or partially cover the arm of a person. The sleeves (130) may be of any length or of the upper body garment (104) may be void of sleeves (130). The pair of sleeves (130) includes a left sleeve (130) and a right sleeve (130) (see FIGS. 2 and 4). Each of the left and right sleeves (130) includes a front sleeve portion (132) (see FIGS. 3 and 5) and back sleeve portion (134) (see FIGS. 3 and 5). The front shoulder portion (122) and front sleeve portion (132) are selectively coupled to the back shoulder portion (124) and back sleeve portion (134) (see FIGS. 3-5), respectively, with the plurality of first fasteners (150). The plurality of first fasteners (150) includes one or more of the following: hook and loop fasteners, a button and buttonhole, a snap fastener, a pair of magnets, a zipper, or any other fastener known in the art to selectively couple a first portion of fabric to a second portion of fabric. Each of the first fasteners (150) is configured to be transitioned from an engaged state (see FIGS. 2-5) to a disengaged state (see FIGS. 6-7). Each of the first fasteners (150) connects a respective front shoulder portion (122) and front sleeve portion (132) to the corresponding back shoulder portion (124) and back sleeve portion (134) respectively in a closed position (see FIG. 2-5). With the first fasteners (150) in the disengaged state, the front shoulder portion (122) and front sleeve portion (132), or the back shoulder portion (124) and back sleeve portion (134), transition the upper body garment (104) to an open position (see FIGS. 6-7). In the open position both the front shoulder portion (122) and the front sleeve portions (130) are folded towards the bottom of the torso covering (140) away from the head of the patient (P) to provide access to one or more arms and a chest of the patient (P). Access may not be needed to the entire chest of the patient (P) and some of the first fasteners (150) maybe transitioned from an engaged state to a disengaged state to give access to one or more of the arms or a portion of the chest in a partially open position (not shown).

The torso covering (140) extends away from the pair of shoulder coverings (120) along and about the central axis (CA) towards the bottom of the upper body garment (104). The lifting straps (158) are individually affixed to the torso covering (140) with stitching, stapling, or any other suitable means of secure attachment. The lifting straps (158) are configured to support a body weight of the patient (P). Each lifting strap (158) is constructed of a durable material selected from the group of canvas, denim, duck cloth, corduroy, ottoman fabric, polyester fleece, wool tweed, suede, vinal, pliable plastic, and poly-para-phenylene terephthalamide. Each lifting strap (158) extends around the outer circumference of the torso covering (140). The plurality of lifting straps (158) number as many as needed to lift a patient (P). For instance, in some versions, the upper body garment (104) is configured to lift relatively heavier patients (P) and may include additional lifting straps (158) to accommodate the increased body weight of the patient (P). Accordingly, an upper body garment (104) adapted to lift a relatively heavier patient may include more lifting straps (158) than an upper body garment (104) adapted to lift a relatively lighter patient (P). The size of the upper body garment (104) may be used as a proxy for the size and weight of the patient's body. For example, a size "large" upper body garment (104) may correspond with a patient's body size and weight. A size "large" may require three lifting straps (158), a size "medium" upper body garment (104) may require two lifting straps (158), and a size "small" upper body garment (104) may require one lifting strap (158). These sizes "large", "medium", and "small" that correspond with a number of lifting straps (158) are merely examples and are not meant to be limiting in any way. In some versions, the number of lifting straps (158) positioned on the torso covering (140) may number from one to five.

Each of the lifting straps (158) include a pair of integral loops in the form of a pair of handles (162) positioned offset from the central axis (CA) and configured to be lifted from the sides of the patient (P). The handles (162) are integrally formed from a loop of the lifting strap material. In some versions, the handles (162) may be extended further from each of the lifting straps (158) in order to allow the number of caregivers (C) to be increased on larger patients (P) needing more people to aid in lifting the patient (P). In such versions suited for heavier patients (P), the handle lengths will alternate in length with adjoining lifting straps (158) so that the handle (162) lengths alternate from long to short about the central axis (CA). In other versions, the handles (162) may be configured to be lifted by a mechanical lifting machine (not shown). In yet other versions, the handles (162) will include additional padding or fabric for the comfort of the caregivers (C) when lifting a patient (P).

FIGS. 2-5 also show the lower body garment (106). The lower body garment (106) may be any length including but not limited to trousers, capri pants, cropped pants, and shorts. The lower body garment (106) may either be configured to better fit a woman or a man or may be a unisex version configured to fit both men and women. The lower body garment (106) includes a rise (170), a pair of leg coverings (180), an access cover (172), a plurality of second fasteners (150) and a plurality of lifting features in the form of a plurality of lifting straps (160).

The pair of leg coverings (180) may be any length and extend along the central axis (CA) from a bottom of the rise (170) towards the feet of the patient (P). The lifting straps (160) are discretely positioned about the lower body garment (106). Each lifting strap (160) is constructed of a durable material selected from the group of canvas, denim, duck cloth, corduroy, ottoman fabric, polyester fleece, wool tweed, suede, vinal, pliable plastic, and poly-para-phenylene terephthalamide. In the present version, the plurality of lifting straps (160) includes a first lifting strap (164) adjacent to a bottom of the rise (170), and a second lifting strap (166) is positioned towards the feet relative to the first lifting strap (164). Each of the lifting straps (160) extends around the outer circumference of each respective leg covering (180) and is integrally attached by stitching, stapling, or other suitable means of secure attachment to the leg covering (180) using a thread or staples.

The plurality of lifting straps (160) on lower body garment (106) may include as many lifting straps (160) as needed to lift a patient (P). The plurality of lifting straps (160) may be referred to as the leg lifting straps or the lower body lifting straps. In some versions, the lower body garment (106) is configured to lift a relatively heavy patient (P) and includes more lifting straps (160) than a lower body garment (106) configured to lift a relatively lighter patient (P). The determination of the number of lifting straps (160) may be determined by the size of the lower body garment (106) that acts as a proxy for the weight of the patient (P). For example, a size "large" may require three lifting straps, a size "medium" lower body garment (106) may require two lifting straps (160), and a size "small" lower body garment (106) requires one lifting strap (160). These examples of "large", "medium", and "small" are merely examples that are not meant to be limiting in any way. The sizes may follow sizing conventions for men and women's clothing or may be a unisex sizing. The number of lifting straps (160) positioned on each of the leg coverings (180) may be from one to five, or from five to ten. Each lifting strap (160) includes a handle (162) positioned proximate to or on an out seam (174). The handles (162) are an integrally formed loop created from a portion of the lifting strap material. The lifting straps (160) and handles (162) positioned on the leg coverings (180) may have similar versions as the lifting straps (160) that are positioned on the torso covering (140) such as the following: longer handles (162), alternating lengths of handles (162), the handles (162) configured for use with lifting machines, and the handles (162) having additional comfort features.

The rise (170) of lower body garment (106) includes a front rise (176), a back rise (178) (see in FIGS. 3-5), an access covering (190), a waist retainer (192), and an accessing opening in the form of a window (194). The rise (170) extends along the central axis (CA) away from the waist retainer (192) to the pair of leg coverings (180). The rise (170) covers a pelvic region of the patient (P) with the front rise (176) and a gluteal region with the back rise (178). The waist retainer (192) extends around the circumference of the patient's body at the top portion of the rise (170). The top portion of the rise (170) is located closest to the upper body garment (104) when the upper body garment (104) and lower body garment (106) are fitted on a patient (P). The waist retainer (192) is configured to hold the lower body garment (106) in a wear position. A wear position is any predetermined, preferred position relative to the patient (P) as selected by the patient (P) and/or a caregiver (C). For example, some patients (P) may prefer to position the top of their lower body garment (106) at, above, or below the navel. For other patients (P), a wear position may be below the abdomen directly resting on the hips. Stated differently, the wear position is the height that a patient (P) wears his or her lower body garment (106). The waist retainer (192) is configured to maintain the lower body garment (106) in the wear position by one or more of any of the following: a waistband and a drawstring, a belt and loops, a buckle, an elastic band, a button and buttonhole, a pair of magnets, one or more snaps, or any other waist retainer known in the art to maintain lower body garments in a wear position.

The window (194) of lower body garment (106) is defined by either the front rise (176), the back rise (178) (see FIG. 4) or both the front and the back rise (178). The window (194) is spaced apart from the waist retainer (192) in a direction towards the feet of the patient (P). The window (194) may be configured as a rectangle, a square, a circle, an oval, a triangle, an octagon, or any shape known in the art to provide access. The plurality of second fasteners (150) is positioned around a perimeter of the window (194) and join the access covering (190) with the window (194) to selectively retain the access covering (190) over the window (194). The access covering (190) is in the form of a flap and may overlap the window (194) or may be flush with the perimeter of the window (194). The plurality of second fasters (150) includes one or more of the following: hook and loop fasteners, a button and buttonhole, a snap fastener, a pair of magnets, a zipper, or any other fastener known in the art to selectively couple a first portion of fabric to a second portion of fabric. Each of the second fasteners (150) is configured to be transitioned from an engaged state (see FIGS. 2-5) to a disengaged state (see FIGS. 6-7). Each of the second fasteners (150) connects the access covering (190) to a perimeter of the window (194) in a closed position (see FIG. 2-5). Some or all of the second fasteners (150) maybe transitioned from the engaged state to a disengaged state (see FIGS. 6-7) to allow the access covering to be partially or fully removed (see FIGS. 6-7). The access covering (190) may be uniformly constructed with the rise (170) as shown or may be constructed of a separate material and be fully removeable in the open position. As shown, the access covering (190) includes a hinge side (142) and a fastening side (144). The hinge side is integrally formed from the same material as the rise (170) and the access covering may be folded about the hinge side (142). The fastening side (144) is opposite the hinge side (142) and includes some or all of the second fasteners (150). Additionally, there may be additional fastening sides (144) around the perimeter of the window (194) between the hinge side (142) and the fastening side (144) that also include the second fasteners (150) that further secure the access covering (190) to the perimeter of the window (194).

Figure 6:
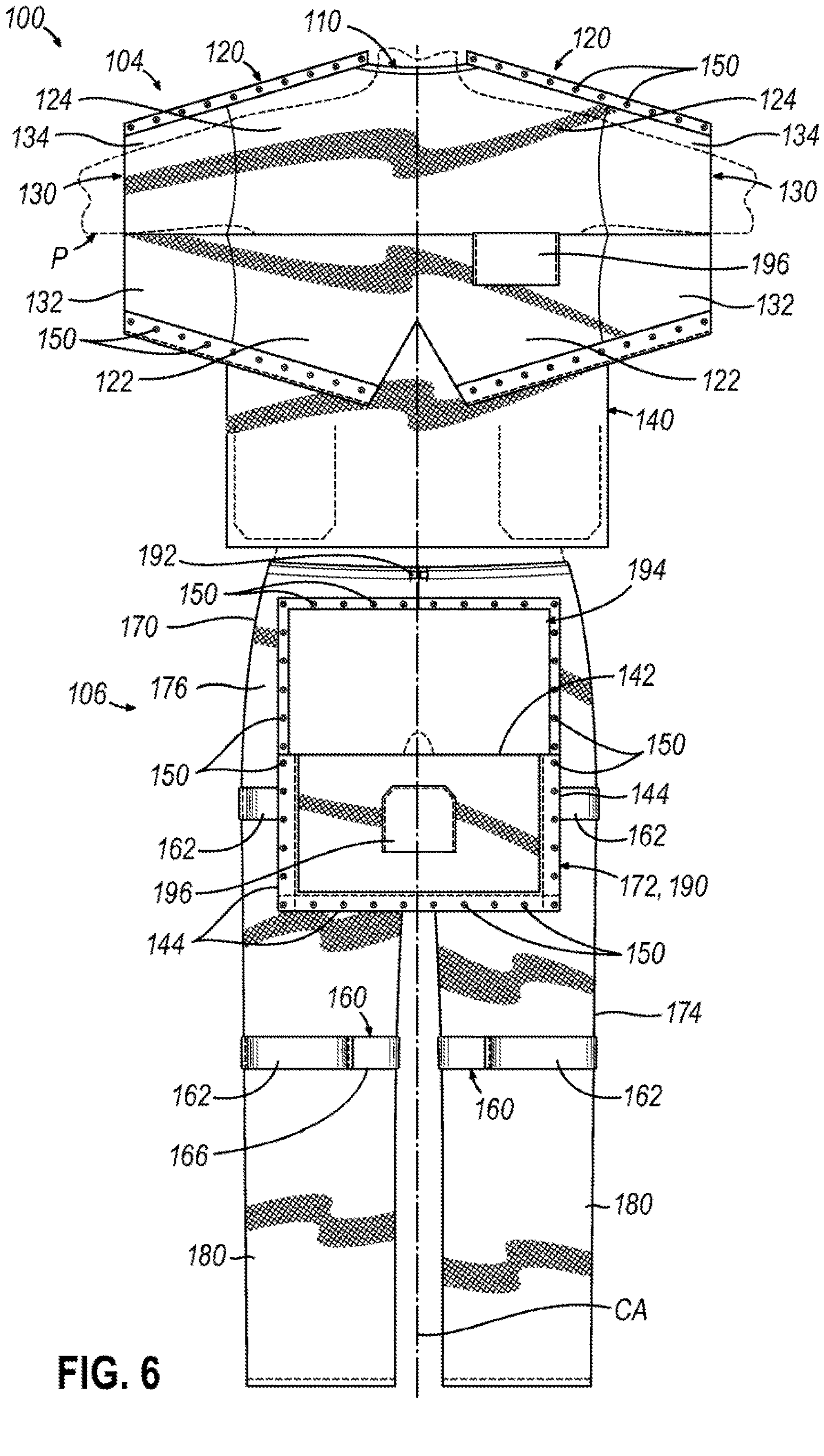
FIG. 6 depicts a front view of the clothing system of FIG. 1 with the pair of front shoulder portions selectively uncoupled from the pair of back shoulder portions in the open position and the access covering in an open position.
Figure 7:
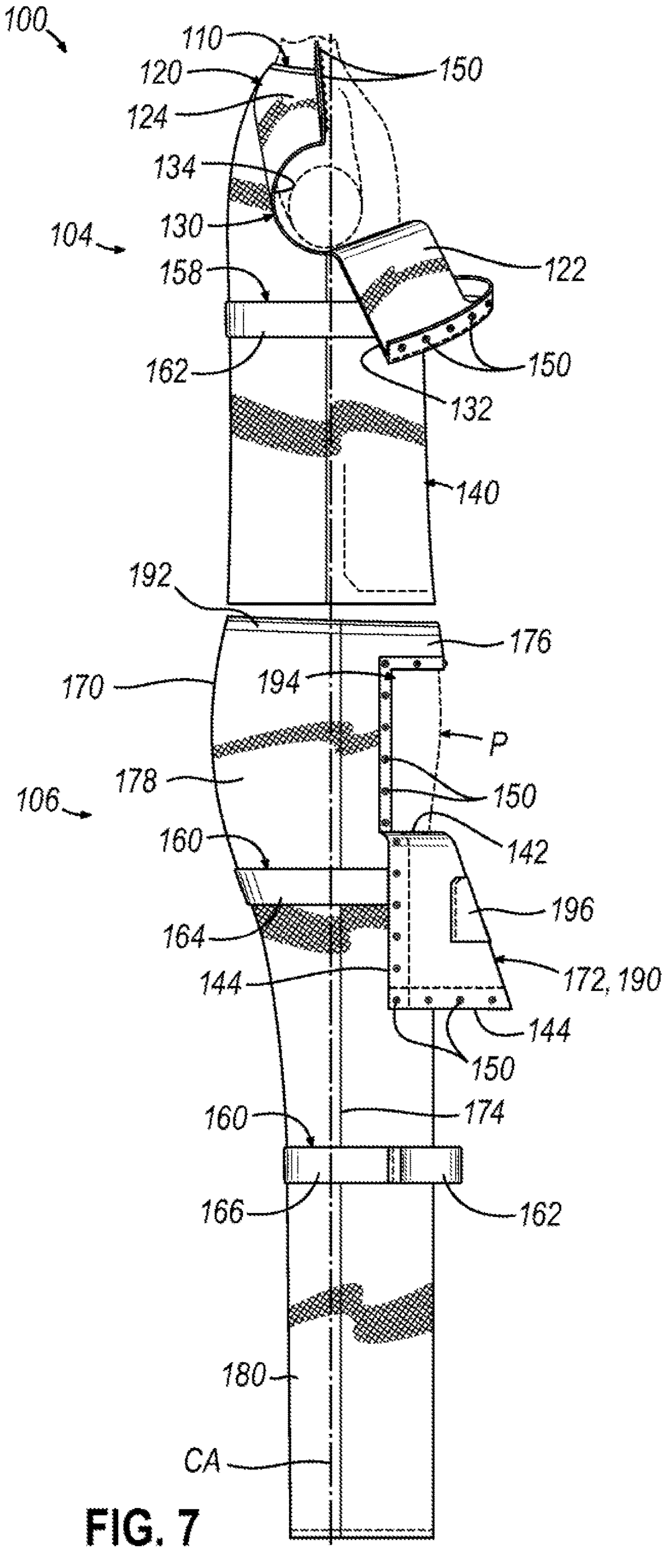
FIG. 7 depicts a right side view of the clothing system of FIG. 1 with the pair of front shoulder portions selectively uncoupled from the pair of back shoulder portions in the open position and the access covering in an open position.

FIGS. 6-7 shows the upper body garment (104) with the front shoulder portions (122) and the front sleeve portions (132) after being transitioned to the open position and the lower body garment (106) with the access covering (190) after being transitioned to the open position. The front shoulder portions (122) and the front sleeve portions (132) are folded downwards towards the bottom of the torso covering (140) to provide access to an upper torso of the patient (P) and or one or more of the arms of the patient (P). The lower body garment (106) is in the open position and has the access covering (190) folded towards the feet of the patient (P) to provide access through the window (194) to a pelvic region of the patient (P). In other versions, the window (194) is defined by the back rise (178) to provide access to the gluteal region of the patient (P).

Figure 8:
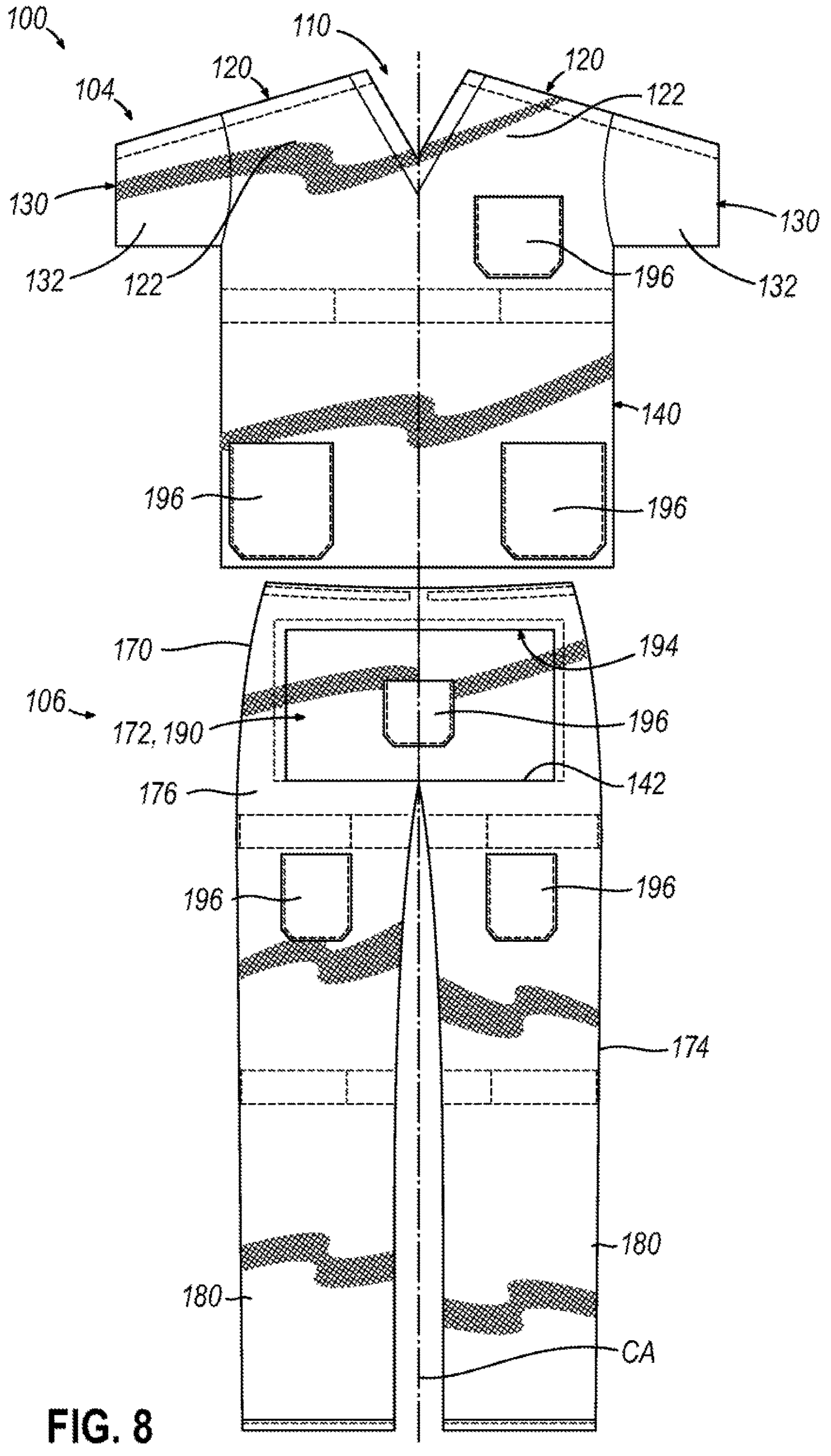
FIG. 8 depicts an interior view of the front of the clothing system of FIG. 1 including pockets positioned on interior surfaces of the upper and lower body garments.

FIG. 8 shows the clothing system (100) turned inside out so that the internal portions of the clothing system (100) may be viewed. The upper body garment (104) further includes a plurality of pockets (196) configured to hold medical equipment such as a heart monitor such as a portable EKG machine, or a drainage collection bulb from a Jackson-Pratt tube. The plurality of pockets (196) is positioned on the inside of the torso covering (140) so that the plurality of pockets (196) may be accessed when the front shoulder portions (122) and front sleeve portions (132) are in the open position or a partially open position so that the equipment or the drainage collection bulb may be regularly accessed for inspection and maintenance. The plurality of pockets (196) may be located in the lower portion of the torso covering (140), or on the inside of the access covering (190).

The lower body garment (106) further includes a plurality of pockets (196) configured to hold medical equipment such as the drainage collection bulb. The plurality of pockets (196) is positioned on at least one of the rise (170), the pair of leg coverings (180), or the access covering (190).

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

I claim:

1. A clothing system, comprising:

(a) an upper body garment comprising:

(i) a neck portion configured to extend about a central axis defined by a patient, wherein the central axis extends from a head of the patient towards feet of the patient, (ii) a pair of shoulder coverings extending from the neck portion obliquely to the central axis, wherein each of the shoulder coverings includes a front shoulder portion and a back shoulder portion, (iii) a torso covering extending away from the pair of shoulder coverings about the central axis, wherein the torso covering includes a material extending annularly and integrally around the central axis and configured to cover a torso of the patient, wherein the torso covering further includes an integral loop configured to loop around the torso of the patient, wherein the integral loop is annularly affixed 360 degrees around the material, and (iv) a plurality of first fasteners, wherein the first fasteners are configured to be transitioned from an engaged state in which the first fasteners connect the front shoulder portions to the back shoulder portions, to a disengaged state in which at least one of the front shoulder portions is disconnected from the respective back shoulder portion and is configured to fold towards a bottom of the torso covering to provide access to an upper torso or arm of the patient; and (b) a lower body garment comprising:

(i) a pair of leg coverings positioned about the central axis, (ii) a rise including a front rise, a back rise, a waist retainer extending circumferentially around a top portion of the rise and configured to maintain the lower body garment in a wear position, and a window defined by one of the front rise or the back rise, wherein the window is spaced apart from the waist retainer, (iii) an access covering configured to cover the window, and (iv) a plurality of second fasteners, wherein the second fasteners are configured to be transitioned from an engaged state in which the second fasteners connect the access covering to one of the front rise or the back rise, to a disengaged state in which the access covering is at least partially disconnected from one of the front rise or the back rise so that the access covering provides access to a lower region of the patient while maintaining the lower body garment in the wear position.

2. The clothing system of claim 1, wherein the upper body garment is selected from the group of a shirt, a cape, a tunic, a smock, a poncho, a tank, and a scrub.

3. The clothing system of claim 1, wherein the lower body garment is selected from the group of a trousers, a capri pants, a cropped pants, and a shorts.

4. The clothing system of claim 1, wherein the waist retainer includes at least one of a waistband and drawstring, a belt and loops, a buckle, an elastic band, a button and buttonhole, a pair of magnets, a snap, and combinations thereof.

5. The clothing system of claim 1, wherein the upper body garment includes a sleeve continuously extending from a respective one of the shoulder coverings in a direction away from the central axis.

6. The clothing system of claim 1, further comprising a plurality of lifting straps discretely positioned on the upper body garment and the lower body garment, wherein the clothing system is configured to support a body weight of the patient when lifted by the lifting straps.

7. The clothing system of claim 6, wherein each of the lifting straps is constructed of a durable material selected from the group of canvas, denim, duck cloth, corduroy, ottoman fabric, polyester fleece, wool tweed, suede, vinal, pliable plastic, and poly-para-phenylene terephthalamide, and combinations thereof.

8. The clothing system of claim 1, further comprising a plurality of lifting straps, wherein each lifting strap is configured to be grasped by a user to lift a respective portion of the clothing system and the patient, wherein the plurality of lifting straps includes an upper body lifting strap that extends around an outer circumference of the torso covering.

9. The clothing system of claim 8, wherein the plurality of lifting straps includes a pair of handles offset from the central axis, wherein each handle is configured to be gripped by a user to lift a respective portion of the clothing system and the patient.

10. The clothing system of claim 8, wherein the plurality of lifting straps includes a first pair of leg lifting straps positioned on the lower body garment adjacent to the rise, wherein each leg lifting strap of the first pair extends around a circumference of a respective one of the leg coverings.

11. The clothing system of claim 10, wherein the plurality of lifting straps further includes a second pair of leg lifting straps positioned on the lower body garment and spaced apart from the first pair of leg lifting straps in a direction away from the waist retainer.

12. The clothing system of claim 1, further including a plurality of pockets, wherein each pocket is positioned on an interior of one of the upper body garment or the lower body garment, wherein the pockets are configured to hold medical equipment.

13. The clothing system of claim 12, wherein a first pocket of the plurality of pockets is positioned on an interior of the lower body garment and is accessible through the window when the second fasteners are in the disengaged state such that the access covering is at least partially disconnected from the one of the front rise or the back rise, wherein a second pocket of the plurality of pockets is positioned on an interior of the upper body garment and is accessible through a space between the front shoulder portions and the back shoulder portions when the first fasteners are in the disengaged state such that at least of the front shoulder portions is disconnected from the respective back shoulder portion.

14. The clothing system of claim 1, wherein the plurality of first fasteners and the plurality of second fasteners are selected from the group of a hook and loop fastener, a button and buttonhole, a snap fastener, a pair of magnets, a zipper, and combinations thereof.

15. The clothing system of claim 1, wherein the access covering is removeable from the lower body garment.

16. A clothing system, comprising:

(a) an upper body garment comprising:

(i) a neck portion configured to extend about a central axis defined by a patient, wherein the central axis extends from a head of the patient toward feet of the patient, (ii) a pair of shoulder coverings extending from the neck portion obliquely to the central axis, wherein each of the shoulder coverings includes a front shoulder portion and a back shoulder portion, wherein each front shoulder portion is separable from the respective back shoulder portion, (iii) a torso covering extending away from the shoulder coverings along the central axis, wherein the torso covering includes a lifting strap extending laterally in both directions away from the central axis and is configured to lift at least a portion of the patient, wherein the torso covering includes a material extending annularly and integrally around the central axis and configured to cover a torso of the patient, wherein the torso covering further includes an integral loop configured to loop around the torso of the patient, wherein the integral loop is annularly affixed 360 degrees around the material, and (iv) a plurality of first fasteners selectively connecting the front shoulder portions to the back shoulder portions, wherein the plurality of first fasteners is configured to be transitioned from an engaged state to a disengaged state so that at least one of the front shoulder portions is at least partially separated from the respective back shoulder portion and is configured to fold towards a bottom of the torso covering to provide access to an upper torso or arm of the patient; and (b) a lower body garment comprising:

(i) a pair of leg coverings positioned on both sides of the central axis, (ii) a rise including a front rise, a back rise, and a waistband extending around a circumference of a top portion of the rise, wherein the waistband has a drawstring fitted therethrough, wherein the drawstring is configured to be tied to maintain the lower body garment in a wear position, (iii) a flap configured to cover a window defined by the front rise and spaced apart from the waistband, wherein the flap includes an interior pocket configured to be adjacent to and facing a crotch of the patient, wherein the flap includes a hinge side and a fastening side, wherein the fastening side has a plurality of second fasteners, wherein the second fasteners are configured to be transitioned from an engaged state to a disengaged state to enable the flap and thus the interior pocket to rotate about the hinge side from a closed position to an open position to provide access to a pelvic region of the patient and to expose the interior pocket while the waistband maintains the lower body garment in the wear position; and (c) a plurality of lifting features positioned at discrete locations on the upper and lower body garments and configured to enable lifting of the clothing system and the patient at the discrete locations.

17. The clothing system of claim 16, wherein the plurality of lifting features includes a plurality of upper body lifting straps affixed to the upper body garment and a plurality of lower body lifting straps affixed to the lower body garment.

18. A clothing system, comprising:

an upper body garment comprising:

(a) a neck portion configured to extend about a central axis defined by a patient, wherein the central axis extends from a head of the patient towards feet of the patient, (b) a pair of shoulder coverings extending from the neck portion obliquely to the central axis, wherein each of the shoulder coverings includes a front shoulder portion and a back shoulder portion, (c) a torso covering extending away from the pair of shoulder coverings about the central axis, wherein the torso covering includes a material extending annularly and integrally around the central axis and configured to cover a torso of the patient, wherein the torso covering further includes an integral loop configured to loop around the torso of the patient, wherein the integral loop is annularly affixed 360 degrees around the material, and (d) a plurality of first fasteners, wherein the first fasteners are configured to be transitioned from an engaged state in which the first fasteners connect the front shoulder portions to the back shoulder portions, to a disengaged state in which at least one of the front shoulder portions is disconnected from the respective back shoulder portion and is configured to fold towards a bottom of the torso covering to provide access to an upper torso or arm of the patient.

19. The clothing system of claim 18, wherein the upper body garment is selected from the group of a shirt, a cape, a tunic, a smock, a poncho, a tank, and a scrub.

20. The clothing system of claim 18, wherein the upper body garment includes a sleeve continuously extending from a respective one of the shoulder coverings in a direction away from the central axis.

* * * * *